United States Patent [19]

Halsey et al.

[11] 4,011,967
[45] Mar. 15, 1977

[54] ELECTRONIC SYSTEM DEVICE FOR CONTROL OF INGREDIENT DISPENSING IN A CUP BEVERAGE VENDOR

[75] Inventors: Richard J. Halsey, Grandview; Melvin R. Heillman, Kansas City, both of Mo.

[73] Assignee: The Vendo Company, Kansas City, Mo.

[22] Filed: July 21, 1975

[21] Appl. No.: 597,429

[52] U.S. Cl. .............................. 222/70; 222/129.4; 194/13
[51] Int. Cl.$^2$ ...................................... G01F 11/00
[58] Field of Search ............... 222/70, 129.1–129.4; 194/3, 13

[56] References Cited
UNITED STATES PATENTS

| | | | |
|---|---|---|---|
| 3,045,870 | 7/1962 | Danziger et al. | 222/129.3 X |
| 3,297,061 | 1/1967 | Nimee | 222/129.4 X |
| 3,329,311 | 7/1967 | Goff et al. | 222/58 X |
| 3,685,692 | 8/1972 | Erne et al. | 222/129.4 X |
| 3,822,723 | 7/1974 | Crowell et al. | 222/70 X |
| 3,904,079 | 9/1975 | Kross | 222/129.4 X |

*Primary Examiner*—Robert B. Reeves
*Assistant Examiner*—Joseph J. Rolla
*Attorney, Agent, or Firm*—Lowe, Kokjer, Kircher, Wharton & Bowman

[57] ABSTRACT

An electronically controlled ingredient dispensing system in hot or cold vending machines uses a voltage ramp generator and a volume controller for correlating a quantity of dispensed ingredients with the voltage ramp output. Circuit elements are provided to latch-in circuits corresponding to each ingredient after a coin triggered relay switch and beverage selection switches are actuated. A voltage comparator circuit functions to compare a timing circuit voltage of increasing magnitude with a manually variable reference voltage (indicative of ingredient quantity) and activates an ingredient dispensing mechanism when the compared voltage reaches a preselected value and deactivates the dispensing mechanism when the voltage reaches a preselected higher value. Further circuit elements are provided to increase the quantity of dispensed ingredients upon activation of an extra ingredient selection switch.

9 Claims, 6 Drawing Figures

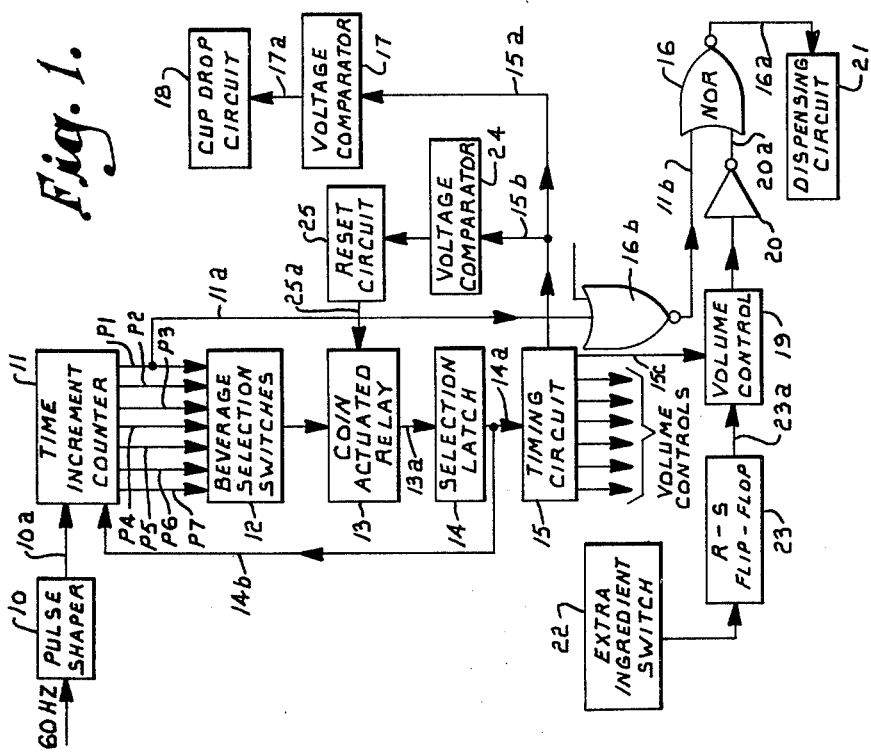
Fig. 1.
Fig. 2a. Fig. 2b.
Fig. 2c. Fig. 2d.
Fig. 3.
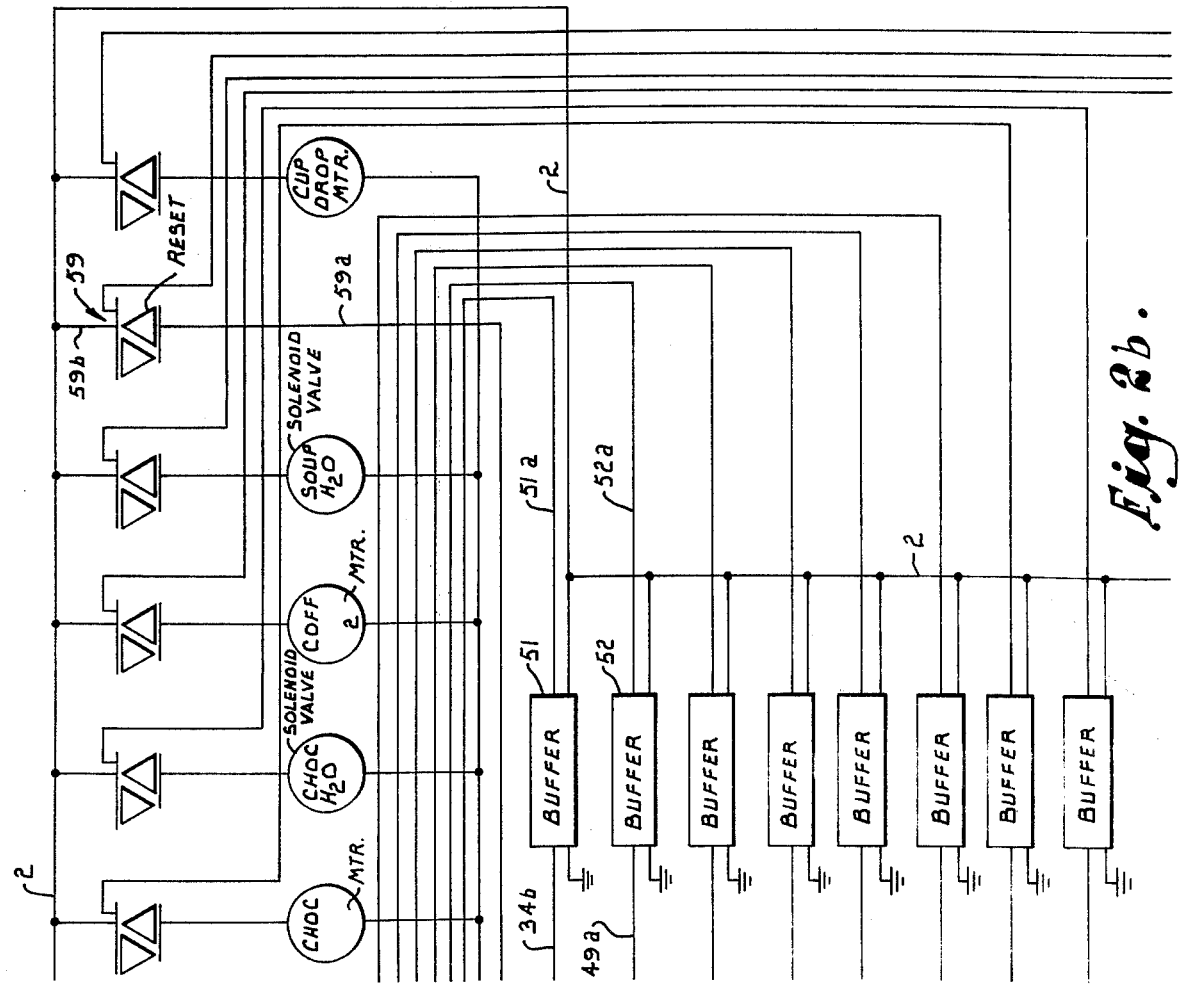
Fig. 2b.

4,011,967

ELECTRONIC SYSTEM DEVICE FOR CONTROL OF INGREDIENT DISPENSING IN A CUP BEVERAGE VENDOR

BACKGROUND AND BRIEF DESCRIPTION OF THE INVENTION

The use of mechanized systems to control the dispensing of ingredients in cup beverage vendors is an art recognized concept. For example, a typical approach utilizes a timing motor having an output shaft with a plurality of cams attached thereto. Rotation of the motor shaft thusly causes the cams to operate on switches which control solenoid valves and/or operate dry ingredient dispensing motors. Accordingly, the quantity of materials dispensed is at least partly determined by the dwell of the cams and the angular rotational speed thereof.

Mechanical control systems, when used for ingredient dispensing, are often inaccurate and difficult to adjust to achieve proper metering of the dispensed materials. For example, the length of a cam shaft (and therefore the number of cams) is limited since excessive shaft lengths tend to warp and to introduce error into the control system. Also, after a period of extensive use, the attendant wear introduces additional error into the system. Further, while the accurate adjustment of cam dwell angles is difficult, even under the best conditions, accessibility for manual adjustment of the cams is frequently very restricted due to the cam box size and typical location within cup beverage vending machines.

The subject invention provides for electronic control of the quantity of ingredients dispensed during the operation of the vending machine. When a coin operated relay switch and any one of several beverage selection switches are actuated, an associated circuit means latches in a circuit corresponding to the selected ingredient. A ramp generator operates in conjunction with a lapsed time voltage comparator circuit to activate an appropriate valve and/or ingredient dispensing motor when the compared voltage reaches a first preselected value and to later turn off the solenoid or dispensing motor when a second predetermined voltage is reached. An adjustable volume control resistive element is provided to permit the second voltage level to be varied thereby permitting the quantity of ingredients to be likewise varied.

A primary object of the invention is to provide a unique and improved method and electronic device for controlling ingredient dispensing in a cup beverage vending machine.

Another object of the invention is to provide a method and electronic device of the character described which is compact in size yet with which easy to effect ingredient volume control adjustments are possible both during the initial manufacturing of the vending machine and after said machine is operational and in the field.

Another object of the invention is to provide a method and device of the character described immediately above which includes a unique circuit means, in the vending machine environment, having an easily accessible and manipulated control mechanism for metering out desired quantities of ingredients. It is a feature of the invention that the combined circuit means and control mechanism easily lends itself to calibration thereby further simplifying the control over the vended or dispensed product.

A still further object of the invention is to provide, in a vending machine of the character described, a unique circuit means and control mechanism of increased reliability which greatly reduces the need for the service and maintenance heretofore common with ingredient dispensing vending machines using mechanical timing cam devices. It is an important feature of the subject invention that rapid initial adjustments of a plurality of ingredient dispensing mechanisms may be made over virtually a complete timing cycle. Known prior art timing devices and systems which use motor shafts with associated cams are not only subject to wear, warpage and adjustment difficulties but generally had a maximum 180° dwell time for the dispensing operation. The subject invention now permits the dispensing of ingredients over virtually a complete timing cycle and concurrently eliminates the above stated difficulties.

Other and further objects of the invention, together with the features of novelty appurtenant thereto, will appear in the course of the following description.

DETAILED DESCRIPTION OF THE INVENTION

In the accompanying drawings, which form a part of the specification and are to be read in conjunction therewith and in which like reference numerals are employed to indicate like parts in the various views:

FIG. 1 is a partial block diagram of the circuit for electronic control of ingredient dispensing in a cup beverage vendor;

FIGS. 2a, 2b, 2c and 2d are portions of the detailed schematic diagram of the circuit for electronic control of ingredient dispensing in a cup beverage vendor; and FIG. 3 is a plot showing how FIGS. 2a, 2b, 2c and 2d are to be arranged for proper viewing.

Figure 2A:
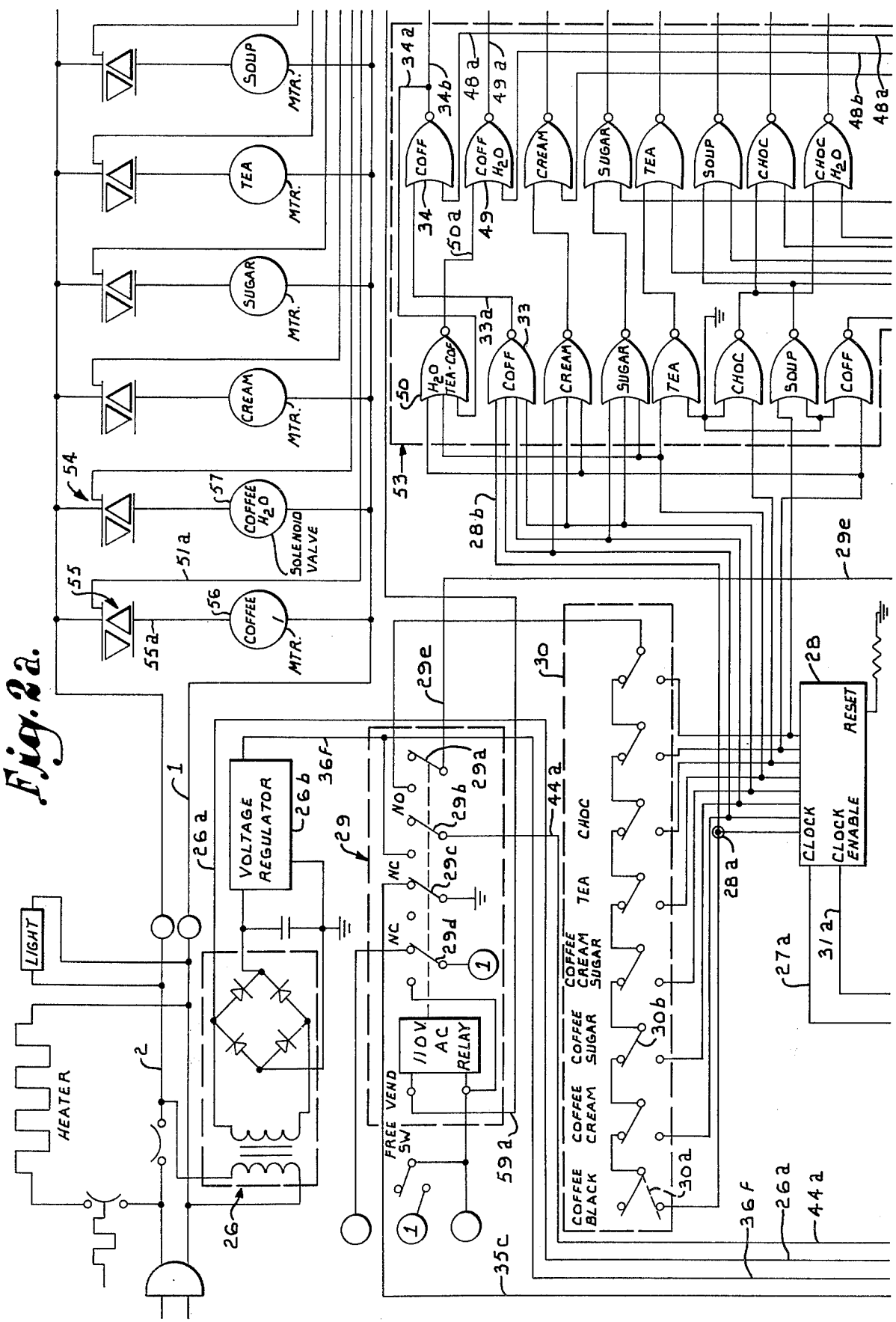

Turning now to FIG. 1, the invention utilizes a 60 Hz sinusoidal input wave which is transformed by a pulse shaper 10 into an essentially square wave having a pulse spacing of approximately 8.333 milliseconds. This square wave signal is delivered to a time increment counter 11 which counts one count each time it is pulsed by the square wave pulses from shaper 10. The counter 11 is designed to produce sequential output pulses at time periods coincident with the 60 Hz input pulses.

Seven output pulses (P1, P2, P3, P4, P5, P6 and P7) are shown emanating from the lower portion of time increment counter 11 and are, in turn, transmitted to a plurality of beverage selection switches 12. Each pulse is delivered through a circuit path connected in series with a specific selection switch therein. Manual depression of one of the beverage selection switches 12 and closure of a normally open coin actuated relay switch 13 completes a circuit path wherein a pulse corresponding to the depressed beverage switch (pulse P1 for example) is transmitted by the time increment counter 11 through the beverage selection switch 12 and the coin acutated relay 13, and is delivered via line 13a to a selection latch circuit 14. The selection latch 14 is comprised of a bistable multivibrator that functions to "latch-in" a circuit corresponding to the particular beverage selected and further functions to activate a timing circuit 15 which includes the later described ramp generator. The output signal of selection latch 14 is simultaneously delivered to the input of the timing circuit 15 via line 14a and to the time increment counter 11 through line 14b. The simultaneous presence at the input of time increment counter 11 of 60 Hz pulses on line 10a and a signal on line 14b disables said counter from counting and causes a high signal to be delivered from the output of counter 11 via line 11a to the input of NOR gate 16b with resultant low output on line 11b to NOR gate 16.

As previously mentioned, a second output signal 14a (produced by selection latch 14) is delivered to the input of the voltage ramp generator timing circuit 15. Each output of the timing circuit 15 is a voltage signal whose magnitude increases linearly with respect to time at a rate determined by the selection of circuit elements comprised therein. Upon receipt of a signal at the input of timing circuit 15, an output signal of steadily increasing voltage is simultaneously delivered on lines 15a, 15b and 15c. The voltage signal thus delivered on line 15a is received by a voltage comparator 17 which compares the magnitude of the increasing voltage signal with a reference voltage determined by preselected circuit elements contained therein. When the magnitude of the input voltage signal at the input of the voltage comparator 17 exceeds that of the reference voltage, an output signal is delivered via line 17a to the cup drop circuit 18, thereby activating same and causing a beverage cup to be dropped for filling.

In a similar manner, an increasing voltage signal from the output of the timing circuit 15 is delivered to the inputs of a plurality of volume controls, same being only generally indicated by a single volume control 19. It should be understood that the function of the volume control is to control the volume (or quantity) of ingredients to be dispensed and that each such volume control comprises a voltage comparator, similar in function to voltage comparator 17 discussed above, along with a convenient means to manually vary the value of some resistive element(s) therein. In any event, the normally low output of volume control 19 goes high when the increasing input voltage on line 15c reaches a preset value; however, this same output goes low again when the input voltage (15c) reaches a second preset value. Thus, as the magnitude of the input voltage rises, volume control 19 turns on and then turns off with the elapsed "on time" corresponding to specific quantity, or volume of beverage ingredients to be dispensed.

The high output signal from volume control 19 is inverted by inverter 20 with the resulting low being delivered via line 20a to the input of NOR gate 16. The simultaneous presence at the input of NOR gate 16 of the low signal on line 20a and the previously discussed low signal on line 11b results in a high signal being transmitted from the output of NOR gate 16 via line 16a to the input of the dispensing motor circuit 21. Upon receipt of the signal on line 16a, the motor dispensing circuit 21 causes a quantity of ingredients to be dispensed with that quantity being proportional to the elapsed time that the signal on line 16a remains high.

The quantity of ingredients thus dispensed may be increased by manually depressing a pushbutton switch corresponding to the particular ingredient, generally indicated by the extra ingredients selection switches 22. Depression of an extra ingredients switch 22 triggers an R-S flip flop 33 which sends a pulse via line 23a to the input of volume control 19. The effect of this received pulse is to extend the elapsed time that the volume control 19 is in an "on state", thereby extending the duration of the high signal at the input of the dispensing motor circuit 21 and accordingly increasing the quantity or volume of ingredients being dispensed.

As indicated above, the system has thus far dropped a cup and dispensed the appropriate beverage ingredients. The control system circuits must then be reset for the next cup beverage. By reference to timing circuit 15, it is seen that a third output voltage signal of steadily increasing magnitude on line 15b is delivered to the input of voltage comparator 24 having operating features similar to that of the previously described voltage comparator 17. When the increasing voltage signal on line 15b reaches a prescribed value, the output of voltage comparator 24 goes low thereby activating the reset circuit 25 and producing an output on line 25a which causes the coin actuated relay 13 to open, thereby unlatching selection latch 14 and resetting the timing circuit 15 to zero voltage.

Turning now more particularly to the more detailed circuit diagram shown in FIGS. 2a, 2b, 2c and 2d, and the layout plot of FIG. 3, power is delivered to the circuitry shown therein from a conventional wall outlet (not shown) to a power supply 26 which comprises a transformer and rectifying bridge (FIG. 2a). One output of power supply 26 (designated as line 26a) is a 60 Hz half wave rectified sinusoidal signal which is delivered to and gated through NAND gate 27 (FIG. 2c) which functions as a "wave shaper" thereby forming a square wave form having a pulse spacing of approximately 8.333 milliseconds. This square wave output is delivered to the "clock" input of conventional time increment counter 28 (FIG. 2a) via line 27a. In its use with the subject invention, counter 28 counts one step each time it receives a pulse on its clock input (line 27a) and delivers a high signal on one of the several output lines shown emanating from the top of counter 28, while the other output lines remain low. Thus, the previously mentioned 60 Hz square wave signal causes counter 28 to count 60 steps per second, thereby resulting in a high signal for each count being sequentially transmitted on one of the several output lines.

The dispensing sequence is initiated by depositing an appropriate coin in the vending machine and depressing a push button switch corresponding to a selected beverage. Deposit of the coin actuates the relay (shown within the broken lines 29) which switches the contacts of relay switches 29a, 29b, 29c and 29d. Thus, switch 29a is switched from its normally open position to a closed position thereby completing a circuit path through the relay switch to line 29e.

Shortly after the operation of relay 29, the selection of a particular beverage is made by depressing any one of the push buttons, generally indicated within the broken lines 30, to effect the closure of the corresponding switch contacts. For example, assume that switch contact 30a, or "COFFEE BLACK", has been depressed. As suggested above, the outputs of counter 28 are sequentially "high" so that eventually the "COFFEE BLACK" selection is present on line 28a and is transmitted through the actuated switch contact 30a (and the remainder of the contacts in array 30) and thence through contact 29a (of relay 29) whereupon this output (on line 29e) is delivered to the input of an R-S flip-flop generally indicated by the numeral 31 (FIG. 2c).

It should be noted that R-S flip-flop 31 is a conventional device which provides a memory function in the present invention. When the counter 28 output pulse on line 29e is received by R-S flip-flop 31, thereby setting the flip-flop, a high signal is simultaneously delivered to both the "clock enable" input of counter 28 (from line 31a) and to the base of transistor 32 (from line 31b). The simultaneous presence of high signals on both the clock and clock enable inputs of counter 28 disables the counter from further counting and maintains a "high" on the output line corresponding to the depressed pushbutton switch. (Line 28a in the present example). This high (on line 28a) is received at the input of NOR gate 33 (see FIG. 2a and line 28b) causing its output to go low, same being thence delivered via line 33a to the input of NOR gate 34. The presence of a low on line 33a and line 48a (described later) causes the output of NOR gate 34 to go high resulting in activation of a later described means to dispense the beverage ingredients.

Figure 2C:
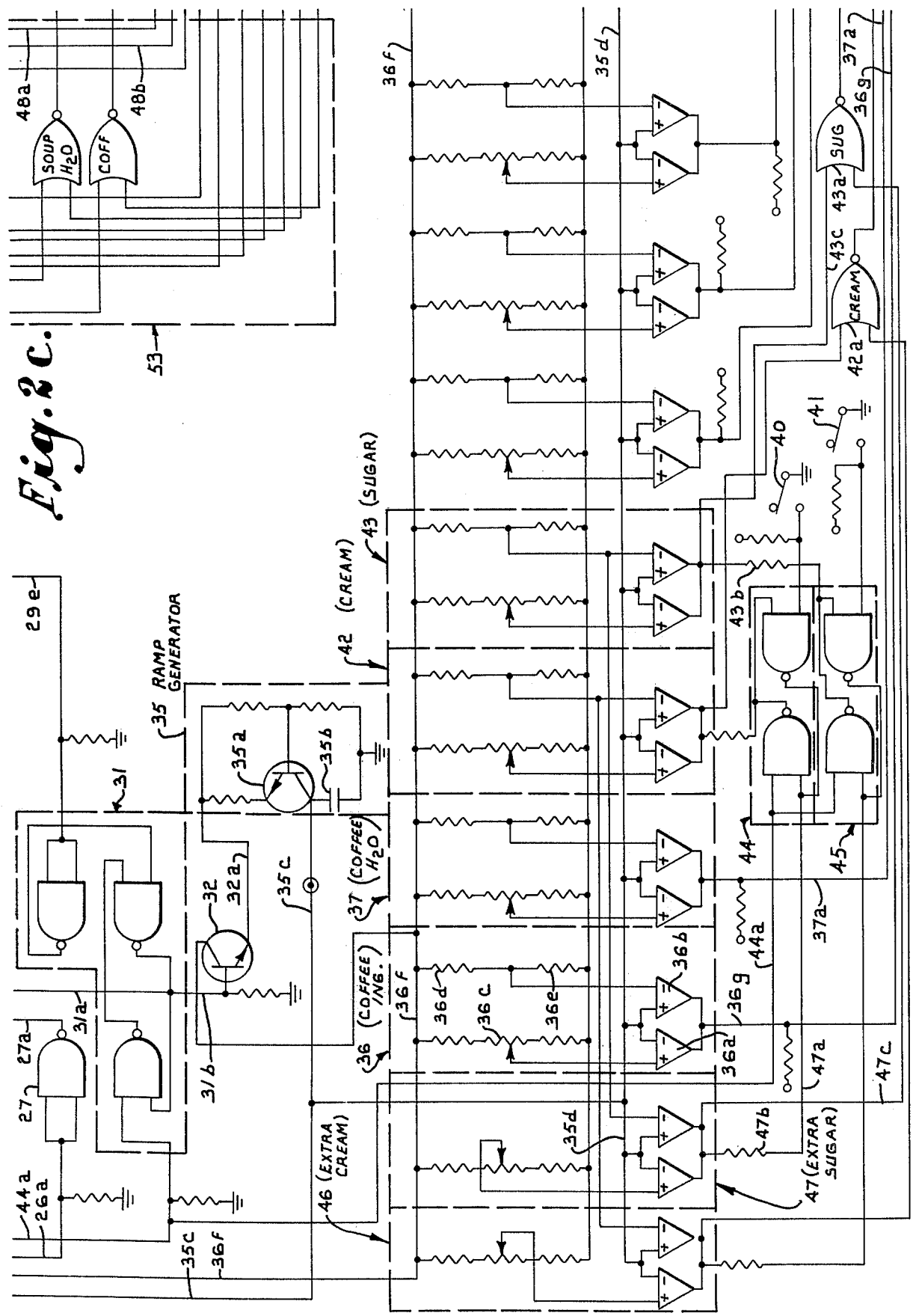

Returning now to R-S flip-flop 31 shown in FIG. 2c, it has been previously pointed out that the output of this flip-flop is delivered to the base of transistor 32 by line 31b. This base voltage turns on transistor 32 thereby causing an output signal to be transmitted from the emitter of transistor on line 32a to the input of a voltage ramp generator generally indicated by numeral 35. The voltage ramp generator 35 (comprising resistive elements and transistor 35a whose emitter output acts as a constant current source to charge capacitor 35b) generates an increasing output voltage signal on line 35c whose rate of increase is linear with respect to time. By preselecting the load values of the resistors and capacitor therein, a specific rate of voltage increase may be obtained, or stated in another way, the load values permit the elapsed time required to build up a specific value of output voltage on line 35c to be preselected. This elapsed time then may function as a timing cycle for control of ingredient dispensing. As will be seen, the ramp generator 35 is activated by the incoming signal (on line 32a) whereupon the magnitude of a voltage output signal (on line 35c) steadily increases from a low level to a preselected maximum level with the maximum voltage level being maintained until the ramp generator 35 is reset in a manner described later.

Figure 2D:
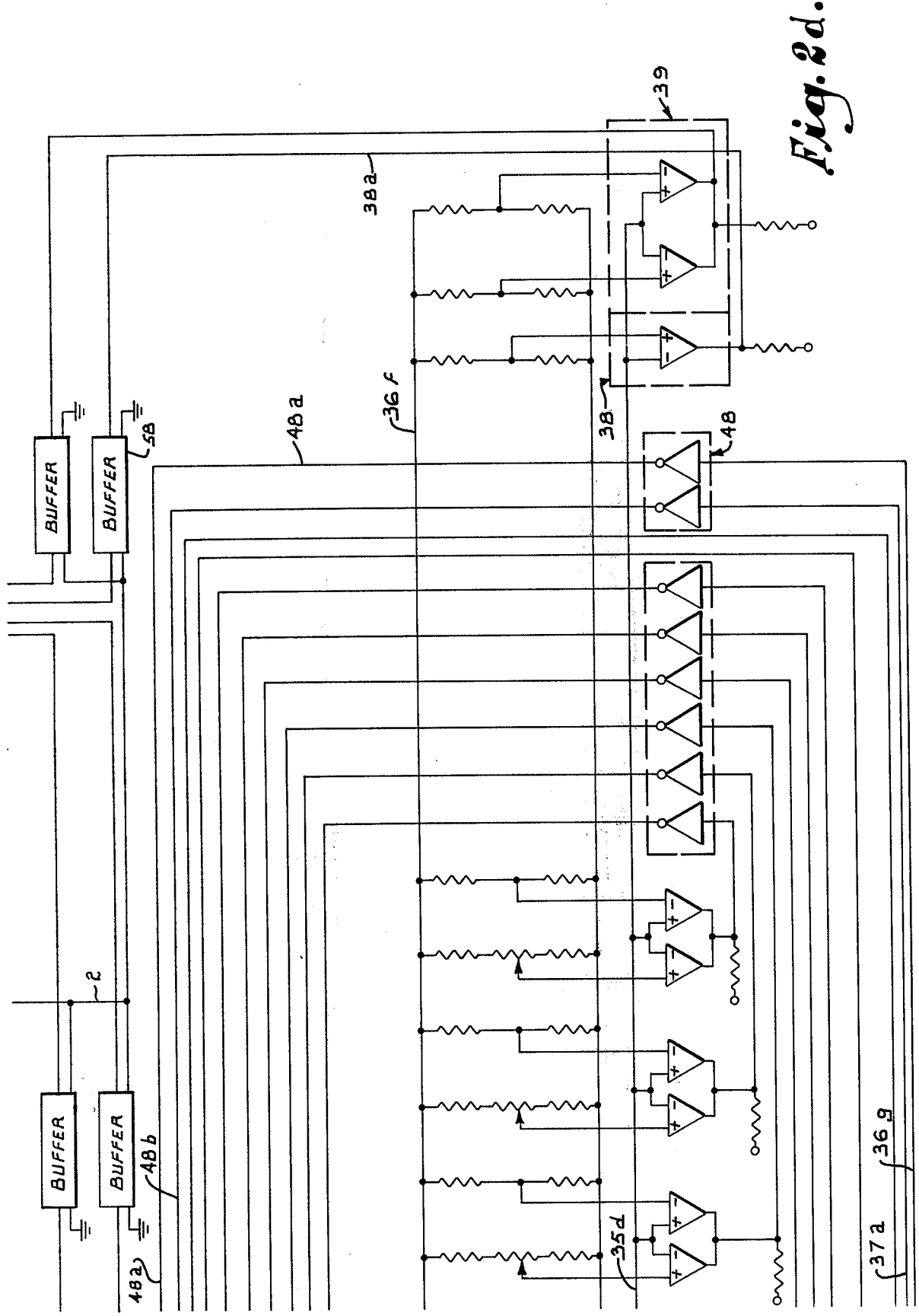

As shown in FIGS. 2c and 2d, the voltage ramp signal on line 35c is delivered to a plurality of adjustable volume controls (circuits) including those generally indicated by numerals 36 and 37 (by means of common bus line 35d). This ramp signal is likewise delivered to voltage comparators designated by numerals 38 and 39 (FIG. 2d) by the same bus. As suggested above, it is a function of each volume control to regulate the volume, or quantity, of the specific beverage ingredient to be dispensed. In the present example, volume controls 36 and 37 are of particular interest since they regulate the volume of the two ingredients needed to produce the beverage COFFEE BLACK, namely, the coffee ingredient and water.

The construction of the volume control circuits comprises two comparators whose inputs are connected to fixed and variable resistive elements. The comparators, designated by the numerals 36a and 36b in the "Coffee Ingredient" control, are operational amplifier ICs of the type manufactured by the Motorola Corporation and identified by its number MC3302. Such a device is characterized by its very high input impedance, low input current and capability of swinging the output voltage to within a very close range of the input voltage. In general application, operational amplifiers may be used as comparators to indicate when a difference exists between a reference voltage and an input voltage. For example, when the input to the comparator exceeds the reference voltage, output of the comparator swings from its maximum positive voltage to maximum negative voltage. In the present invention, an operational amplifier or any other high gain linear amplifier may be employed to perform this comparing function.

As shown in FIG. 2c, comparators 36a and 36b are connected such that their inputs compare the magnitude of the voltage ramp signal on line 35d with the regulated voltage (a constant reference voltage from voltage regulator 26b in FIG. 2a) appearing on line 36f. The voltage ramp signal appearing on line 35d is delivered to the negative input gate of comparator 36a and to the positive input gate of comparator 36b. The positive input gate of comparator 36a is connected to the center tap of variable resistor 36c while the negative input gate of comparator 36b is connected to a terminal between resistors 36d and 36e whose fixed resistive values are preselected. The two comparators are interconnected to perform an "ANDING" function in that both comparators must be in an on-state in order to produce a high output signal on line 36g. For example, when the magnitude of the voltage ramp signal at the positive gate of comparator 36b exceeds that of the voltage level of the negative gate of the same comparator, and, the voltage level at the negative gate of comparator 36a is lower than the voltage level at the positive gate of the same comparator, both comparators are in an on-state and a high output is transmitted therefrom on line 36g. The voltage level at which the volume control "turns-on" is determined by the load value of fixed resistors 36d and 36e while variable resistor 36c determines the voltage level of the volume control turn-off. Therefore, by adjustment of resistor 36c, the on-time of the volume control, and consequently the volume of dispensed ingredients, may be conveniently adjusted.

As a further feature of the invention, additional quantities of specific beverage ingredients, cream and sugar for example, may be caused to be dispensed by manually depressing pushbutton selection switches. In the present invention, "extra sugar" and "extra cream" selection switches 40 and 41, respectively, (see FIG. 2c) will be conveniently located for operator use on the vending machine. Toggling of either of these switches (40 or 41) sets a corresponding R-S flip-flop (either 44 or 45, respectively). The appropriate flip-flop (Memory) functions in cooperation with its corresponding extra sugar 47 and extra cream 46 volume control and with the regular sugar and cream volume controls, 43 and 42, respectively.

The process of dispensing an extra quantity of an ingredient is initiated by selecting a beverage containing the ingredient (such as "Coffee with Sugar") by means of one (switch 30b for COFFEE with sugar, FIG. 2a) of the previously discussed beverage selection switches 30. Toggling of this switch causes each of the volume controls to be activated including sugar volume control 43 and extra sugar volume control 47. Toggling of extra sugar switch 40 grounds one input to multivibrator 44 (FIG. 2c) so that this ground condition coupled with the presence of an input signal from voltage regulator 26b through switch 29b and appearing on line 44a results in the bistable multivibrator 44 being activated. A resulting high output appears on the output of extra sugar volume control 47 via line 47a through resistor 47b. Since both the sugar and the extra sugar volume control outputs are inputted to the sugar NOR gate 43a, only one or the other will output a high to the input thereof due to the functioning of multivibrator 44. Thusly, with the low now appearing across resistor 43b, the output from the sugar volume control 43 on line 43c is low, while the high on line 47a is transmitted to the input of NOR gate 43 via resistor 47b, the high extra sugar volume control output and eventually line 47c. The net effect of this high (on line 47c to NOR gate 43a) is to override the sugar volume control 43 by extending the elapsed time that a high signal remains on an input to NOR gate 43. It should be noted that the "extra" volume controls 46 and 47 function in a manner similar to that of the previously discussed volume controls and include a variable resistive element to control the duration of an output signal therefrom. Thus, the quantity of extra sugar dispensed is determined by the adjusted on-time of extra sugar volume control 47 rather than by sugar volume control 43 whose output is of shorter duration.

When the extra ingredient timing cycle runs out, the appropriate comparator output within the extra volume control (47) goes low so that the voltage drop across resistor 47b is sufficient to effect the toggling or turning off of the sugar NOR gate 43a to end its on-time for dispensing purposes. It is of course noted that the extra cream circuitry functions and operates with multivibrator 45, switch 41, extra cream volume control 46, NOR gate 43a and the cream volume control 42 in a manner similar to that described above.

Returning again to volume controls 36 and 37, at a certain time in the qontrol system timing cycle, the outputs of controls 36 and 37 (designated by lines 36g and 37a, respectively) go high. These highs are delivered to two inverters 48 (FIG. 2d) which invert the signals and then deliver same to the inputs of NOR gates 34 and 49 via lines 48a and 48b, respectively (see FIGS. 2a, 2c and 2d). As suggested above, counter 28 delivers a high to NOR gate 33 which is inverted thereby, with the resultant low being received (via line 33a) at the input of NOR gate 34. Thus, with two such low signals on each input, the NOR gate 34 output goes high and is delivered both to NOR gate 50 (via line 34a) and to buffer 51 (via line 34b). The high transmitted to the input of NOR gate 50 causes the output of same to go low, and to be delivered to the input of NOR gate 49 on line 50a. Thus, the presence of two low signals at the input of NOR gate 49 results in a high output being delivered on line 49a to buffer 52. It should be noted that the same gating sequence described above is utilized by other gate combinations corresponding to specific ingredient selections and that the subject gates are generally indicated as being within the broken lines 53 in FIGS. 2a and 2c.

As mentioned above, highs on line 34b (corresponding to dispensing of coffee ingredients) and on line 49a (corresponding to dispensing of water) are delivered to the inputs of buffers 51 and 52, respectively. These buffers comprise opto-isolators comprising an NPN phototransistor and an infrared light emitting diode. The internal configuration of the opto-isolator is such that an input signal to this device triggers a light emitting diode, with the light thus generated being received by the base electrode of the phototransistor thereby turning on the emitter of same. The opto-isolator is a conventional device used for electrical isolation such as that manufactured by the Motorola Corporation and identified by its number 4N28. The output signals of buffers 51 and 52 (lines 51a and 52a, respectively) are then delivered to the input gates of TRIACS 54 and 55. These TRIACS are also a conventional device, manufactured by the General Electric Corporation, and function so that activation of its input gate terminal by a direct current signal switches an alternating current signal through its output.

Turning more specifically to TRIAC 55, the input to same is transmitted from the output of buffer 51 via line 51a. Upon receipt of an input signal, TRIAC 55 switches motor 56 into a series connection with a ground potential shown as line 55a. Motor 56 is thus energized, thereby dispensing a quantity of coffee ingredients. In a similar manner, TRIAC 54 causes solenoid valve 57 to be energized thereby dispensing a quantity of water. As previously discussed, the adjustment of the values of the elements comprising volume controls 36 and 37 determines the elapsed time that the dispensing means remain activated. At a time in the control system timing cycle when the preselected quantities of ingredients have been thus dispensed, the outputs of volume controls 36 and 37 go low and the aforementioned dispensing motors will be deactivated.

At a later time in the timing cycle, a means, including operational amplifier 38 (FIG. 2d), for resetting the various circuits is activated. The output of operational amplifier 38 goes high when the voltage level on the positive input gate thereto exceeds the voltage level on its negative input gate. The voltage applied to the negative gate of amplifier 38 is actually the voltage ramp generator output which is delivered to the gate by the common bus line 35d while the voltage on the positive gate of amplifier 38 is the constant reference voltage. The manner of operation of amplifier 38 is therefore similar to that of the previously discussed volume controls in that the presence of output transmission of amplifier 38 is determined by the output voltage level of ramp generator 35. At a time in the timing cycle when the ramp generator output voltage exceeds that of the reference voltage for amplifier 38, the output of the amplifier goes low and is delivered via line 38a through buffer 58, thence to the input of TRIAC 59 (FIG. 2a). The low at the input of TRIAC 59 causes the TRIAC to switch the ground potential line 59b from a series connection with relay 29 via line 59a, to an open circuit thereby deenergizing the relay. Deenergizing relay 29 results in switch 29c being toggled from an open position to its normally closed position, thereby grounding the ramp generator 35 by way of line 35c. More specifically, grounding of the ramp generator output on line 35c discharges capacitor 35b thereby resetting ramp generator 35 to zero volts and, therefore, resetting the control system timing cycle. In a similar manner, switch 29b is toggled to its normally open position thereby resetting counter 28 so that the control system is thus reset for dispensing of the next cup beverage.

From the foregoing, it will be seen that this invention is one well adapted to attain all of the ends and objects herein set forth, together with other advantages which are obvious and which are inherent to the structure.

It will be understood that certain features and subcombinations are of utility and may be employed without reference to other features and subcombinations.

As many possible embodiments may be made of the invention without departing from the scope thereof, it is to be understood that all matter herein set forth or shown in the accompanying drawings is to be interpreted as illustrative and not in a limiting sense.

Having thus described our invention, we claim:

1. An apparatus having mechanisms for dispensing ingredients capable of producing a beverage of cup proportion, said apparatus comprising:
   means for selecting a beverage to be dispensed by said apparatus;
   a source of said ingredients constituting said beverage;
   electronic means for producing a time base; said time base producing means including a timing circuit means for producing an output voltage that varies linerally with respect to time, and means for initiating the production of said output voltage in accordance with the occurrence of preselected events including the selection of a beverage by said selection means;
   means for correlating said electronically produced time base with a quantity of ingredients; and
   means for causing said correlated quantity of said ingredients to be dispensed from said ingredients source by said mechanisms thereby producing a cup portion of said beverage.

2. The combination as in claim 1 wherein said time base correlating means includes a means for producing a voltage level corresponding to a preselected quantity of ingredients to be dispensed, means for comparing said linearly varying voltage with said voltage level, and gate means interconnected with said mechanisms and said comparing means for procucing an output signal capable of effecting the operation of said dispensing mechanisms corresponding to the output of said comparing means.

3. The combination as in claim 1 wherein said time base correlating means includes a means for producing a first and second voltage level,
   means for comparing said linearly varying voltage with said first and second voltage levels, said comparing means producing a first output signal condition when said varying voltage reaches a preselected relationship with said first level and a second output signal condition when said varying voltages reaches said second level, and
   means interconnected with said comparing means for positioning a cup to receive said ingredients when said comparing means signal condition corresponds to said first voltage level relationship, said means causing the dispensing of said ingredients being made operable when said comparing means signal condition corresponds to said second voltage level.

4. The combination as in claim 3 wherein said comparing means is included within a volume (quantity) control circuit for each beverage being dispensed, each said volume (quantity) control circuit including means for establishing a reference voltage and means for varying said reference voltage, said voltage varying means including a manually adjustable circuit component.

5. The combination as in claim 3 including circuit means interconnected with said comparing means and said means causing the dispensing of said ingredients for effecting the dispensing of extra quantities of ingredients and for overriding said means causing the dispensing of said ingredients.

6. The combination as in claim 3 wherein said apparatus includes a means for varying the quantity of ingredients dispensed by said mechanisms, said means including circuit means for varying at least one of said voltage levels.

7. The combination as in claim 6 wherein said beverage selecting means includes a plurality of switches, each of said switches corresponding to a different beverage.

8. A cup beverage vending apparatus having an electrical system for controlling the dispensing of ingredients which comprise all or a portion of said beverage, said apparatus comprising
   a source of electrical power,
   a plurality of switches having an on and an off condition, each of said switches corresponding to a particular beverage,
   a coin actuated relay interconnected with said switches and said source of electrical power,
   an electrical time base including a ramp generator means for producing a linearly varying output voltage when activated,
   means interconnecting said switches, said relay and said time base for activating said ramp generator means when any one of said switches is in its on condition and when said coin actuated relay is actuated to thereby produce said linearly varying output voltage,
   a plurality of volume control means for establishing a reference voltage, said volume control means being interconnected with said source of electrical power and said ramp generator output voltage and having a means for comparing the reference voltage with said linearly varying voltage,
   a cup drop means for placing a cup in proximity to receive said ingredients,
   means for dispensing said ingredients into said cup,
   one of said volume control means being operable to effect the operation of said cup drop means thereby causing a cup to be placed in position to receive a beverage when said linearly varying output voltage corresponds to a first preselected reference voltage, other of said volume control means being operable to effect initiating of the dispensing of said ingredients into said cup when said linearly varying voltage corresponds to a second preselected reference voltage and to cause said dispensing means to cease dispensing said ingredients when said linearly varying voltage reaches a third preselected reference voltage.

9. The combination as in claim 8 wherein said apparatus includes a means for manually changing the level of said reference voltage to thereby change the quantity of ingredients being dispensed.

* * * * *